United States Patent [19]

Vallejos

[11] Patent Number: 4,846,138
[45] Date of Patent: Jul. 11, 1989

[54] LOW PROFILE INTERNAL COMBUSTION ENGINE

[75] Inventor: Tony E. Vallejos, Lancaster, Calif.

[73] Assignee: Alto Automotive, Inc., Deerfield, Ill.

[21] Appl. No.: 219,326

[22] Filed: Jul. 14, 1988

Related U.S. Application Data

[63] Continuation-in-part of Ser. No. 890,313, Jul. 28, 1986, abandoned.

[51] Int. Cl.⁴ .................................... F02B 23/00
[52] U.S. Cl. ........................ 123/657; 123/188 AA
[58] Field of Search .............. 123/253, 260, 262, 657, 123/665, 664, 188 R, 188 AA, 90.1, 188 AC, 193 H, 193 CH

[56] References Cited

U.S. PATENT DOCUMENTS

| | | | |
|---|---|---|---|
| 2,057,147 | 10/1936 | Holmes | 123/657 |
| 2,062,013 | 11/1936 | Opolo | 123/193 CH |
| 2,160,755 | 5/1939 | Sandblom | 123/657 |
| 2,591,156 | 4/1952 | Huber | 123/188 N |
| 2,685,869 | 8/1954 | Fenney et al. | 123/260 |
| 4,036,187 | 7/1977 | Ting | 123/257 |
| 4,495,906 | 1/1985 | Bender et al. | 123/188 GC |

FOREIGN PATENT DOCUMENTS

3327948 2/1985 Fed. Rep. of Germany.

Primary Examiner—David A. Okonsky
Attorney, Agent, or Firm—Paul L. Ahern; Edward W. Osann, Jr.

[57] ABSTRACT

An internal combustion engine of the valve-in-head type having a low profile cylinder head which requires minimal headroom in the engine compartment of an automotive vehicle. The cylinder head has a rectilinear configuration with the valve trains disposed on horizontal axes extending transversely of the cylinder head. Each valve train in the cylinder head is provided with precise axial support at both ends of the train. The engine has a relatively thin upstanding combustion chamber over each cylinder and one or more pairs of poppet valves per cylinder each having a sealing surface adjacent its outer edge for engagement with respective seats defined by axially aligned header tubes. Each valve has a relatively short neck extending through the combustion chamber during the intake and compression strokes and when the fuel-air mixture is fired. The valve spring of each valve train is situated between a fixed abutment attached to the side wall of the cylinder head and the end of the valve cage remote from the poppet valves.

29 Claims, 9 Drawing Sheets

LOW PROFILE INTERNAL COMBUSTION ENGINE

This application is a continuation-in-part of my prior co-pending application Ser. No. 06/890,313, filed July 28, 1986.

The present invention relates in general to an improved valve-in-head reciprocating internal combustion engine and, more specifically, to such an engine having a low profile cylinder head which permits the engine to fit compactly within an engine compartment with minimal headroom. The engine is adaptable for operation on gasoline, diesel oil, or other hydrocarbon fuels.

BACKGROUND OF THE INVENTION

Valve-in-head engines of the type known heretofore include sizeable combustion chambers in the cylinder head. This tends to make the head rather bulky and relatively tall. The intake and exhaust valves of such engines are generally inaccessible without first removing the head from the cylinder block. Examples of these engines are shown in the following prior patents:

| U.S. Pat. No. | Patentee | Date Issued |
| --- | --- | --- |
| 1,129,452 | Charters | 1915 |
| 1,213,582 | Brown | 1917 |
| 1,599,354 | Arnold | 1926 |
| 1,855,634 | Ingalls | 1932 |
| 2,013,006 | Obram | 1935 |
| 2,134,250 | Heintz | 1938 |
| 2,685,869 | Fenney, et al | 1954 |

Various poppet valve constructions utilizing lubricant or water cooling, and valves with neck configurations to facilitate heat transfer from the valve head, are also present in the prior art. Examples of these valve constructions are shown in the following patents:

| U.S. Pat. No. | Patentee | Date Issued |
| --- | --- | --- |
| 1,101,590 | Upton | 1914 |
| 1,294,419 | Dady | 1919 |
| 2,122,484 | Murray | 1938 |
| 2,418,674 | Steiner | 1947 |
| 3,102,524 | Celli | 1963 |
| 4,169,488 | Goloff | 1979 |
| 4,495,906 | Bender | 1985 |

Cam follower cages, and valve stem alignment means with spring retained valve closure, are likewise taught in the prior art. The following prior art patents illustrate these constructions:

| U.S. Pat. No. | Patentee | Date Issued |
| --- | --- | --- |
| 1,173,105 | Fekete | 1916 |
| 1,294,419 | Dady | 1919 |
| 1,399,283 | Zucker | 1921 |
| 1,855,634 | Ingalls | 1932 |
| 4,471,729 | Eickmann | 1984 |

SUMMARY OF THE INVENTION

One object of the present invention is to provide an internal combustion engine of the valve-in-head type having a low profile cylinder head which requires minimal headroom in the engine compartment of an automotive vehicle.

Another object of the invention is to provide an engine of the character set forth above wherein each valve train in the cylinder head is provided with precise axial support at both ends of the train.

A further object is to provide a valve train of the above type in which the valve spring is situated between a fixed abutment attached to the side wall of the cylinder head and the end of the valve cage remote from the poppet valve.

Another object of the invention is to provide a cylinder head for an engine of the foregoing type with a relatively thin upstanding combustion chamber over each cylinder and one or more pairs of closely spaced valve stems extending transversely therethrough.

A further object is to provide a cylinder head of the foregoing character utilizing one or more pairs of poppet valves per cylinder each having a sealing surface adjacent its outer edge and a relatively short neck extending through the combustion chamber during the intake stroke and when the fuel-air mixture is fired.

Still another object is to provide a valve containing cylinder head wherein the poppet valves, valve seats, follower cage, valve spring, and valve spring holder can be quickly disassembled without removing the cylinder head from the engine.

The foregoing is accomplished by forming the cylinder head in a low profile rectilinear configuration with the valve trains disposed on horizontal axes extending transversely of the cylinder had; the camshaft journaled on a horizontal axis offset laterally from the central longitudinal plane of the cylinder head and engaging the follower cages of the valve trains; intake and exhaust poppet valves in the respective valve trains adapted to extend through relatively thin combustion chambers for engagement with respective seats defined by axially aligned header tubes; the height of the cylinder head being determined substantially by the size of the coolant jacket surrounding each header tube.

Other objects and advantages of the invention will become apparent from the following description and the accompanying drawings.

While the present invention is susceptible of various modifications and alternative constructions, there is no intention to limit the invention to the specific forms illustrated and described herein. On the contrary, the intention is to cover all modifications and alternative constructions falling within the spirit and scope of the invention as set forth in the appended claims.

DETAILED DESCRIPTION OF THE INVENTION

Referring more specifically to FIGS. 1-5, the invention is there exemplified in an illustrative valve-in-head, reciprocating internal combustion engine 10 which may have one or more cylinders and, in this case, four in line, with associated pistons 13. The engine 10 is capable of using a variety of hydrocarbon fuels. In this instance, it is powered by regular unleaded gasoline and operated through a conventional carburetor and ignition system. A novel low profile cylinder head 11 containing cam driven valve and combustion chamber means is superimposed upon conventional cylinder block 12 of the engine.

Figure 1:
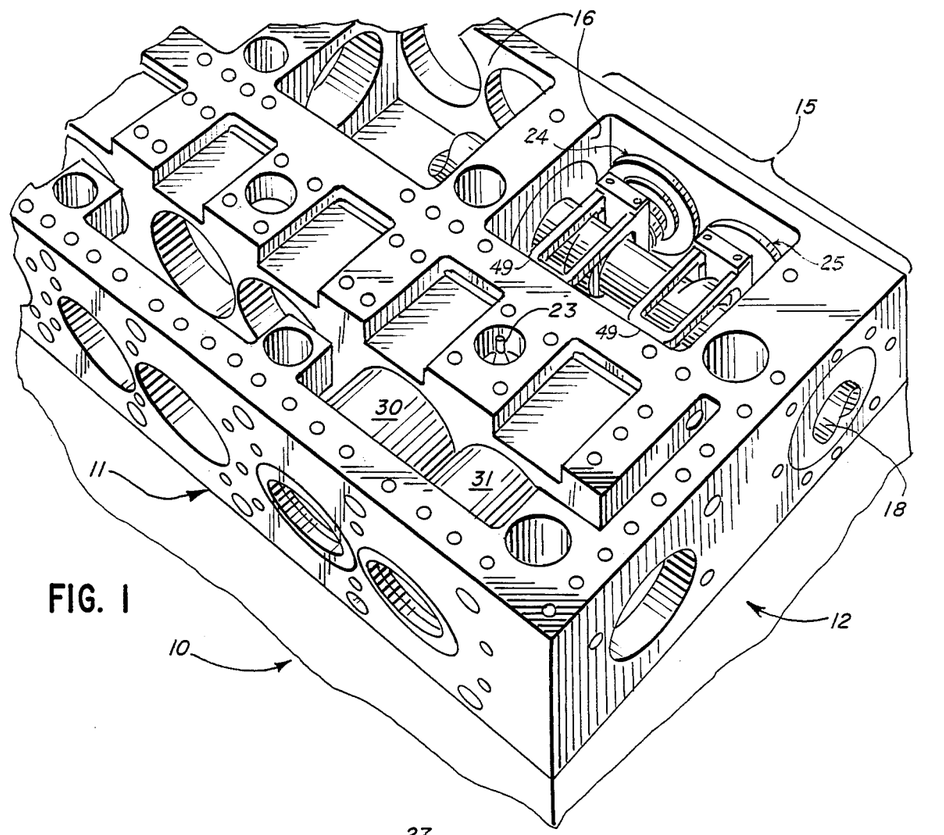
FIG. 1 is a right front perspective view of a low profile cylinder head exemplifying the present invention and mounted on the block of an illustrative four cylinder internal combustion engine.
Figure 2:
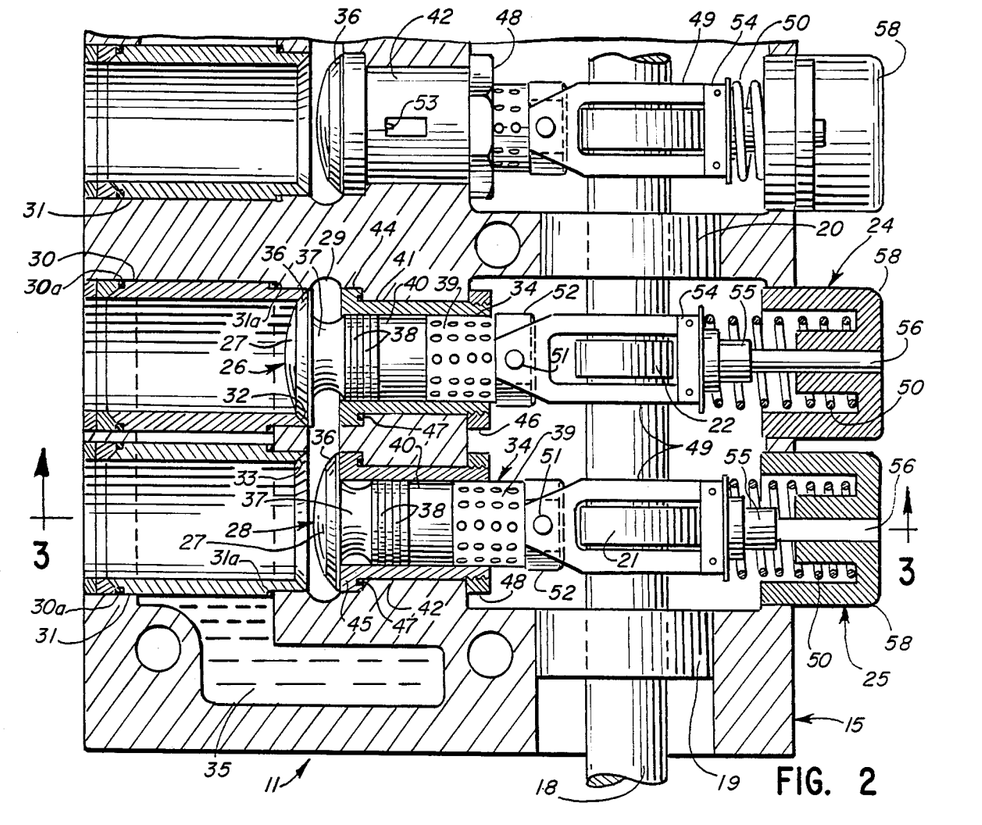
FIG. 2 is an enlarged, fragmentary view of the valve trains and a portion of the camshaft, taken in the plane of the line 2—2 in FIG. 3.
Figure 3:
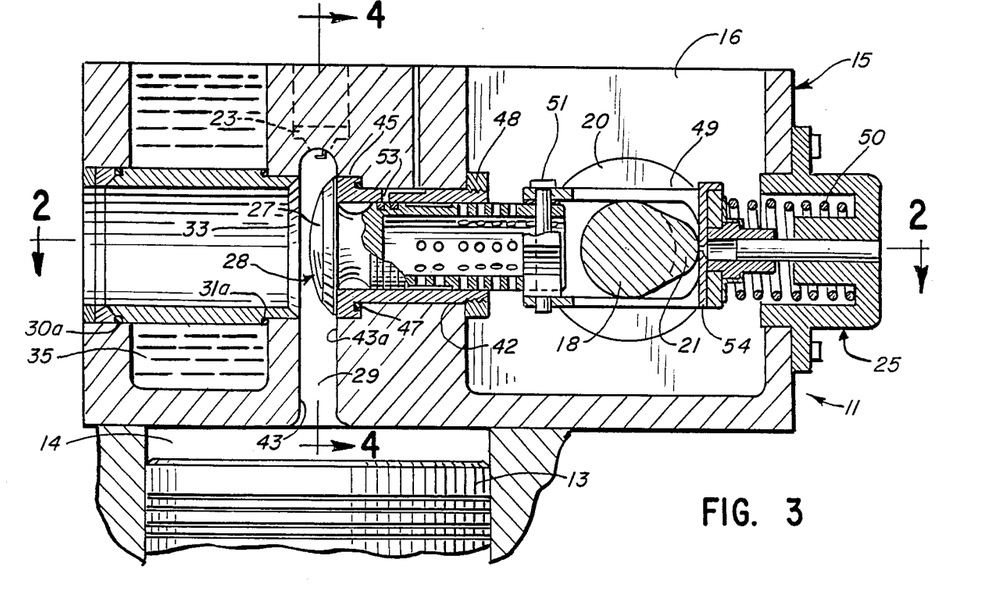
FIG. 3 is an enlarged, fragmentary view of a single valve train taken in the plane of the line 3—3 in FIG. 2.

Each cylinder 14 has a cooperating increment 15 of the cylinder head 11 associated with it. For purposes of simplifying the description, reference will be made to that portion of the cylinder head associated with the foremost cylinder 14, it being understood that the remaining head increments associated with the other cylinders will be substantially identical with the increment 15. The latter comprises a well 16 through which camshaft 18 extends longitudinally of the cylinder head, being journaled in bearings 19, 20 recessed in the front and rear walls of the well (FIGS. 1-3). The camshaft 18 includes a pair of cams 21, 22 which respectively operate a pair of valve trains 24, 25 of identical construction. The rearmost valve train 24 operates intake valve 26, while the foremost valve train 25 operates exhaust valve 28 (FIG. 2).

Figure 4:
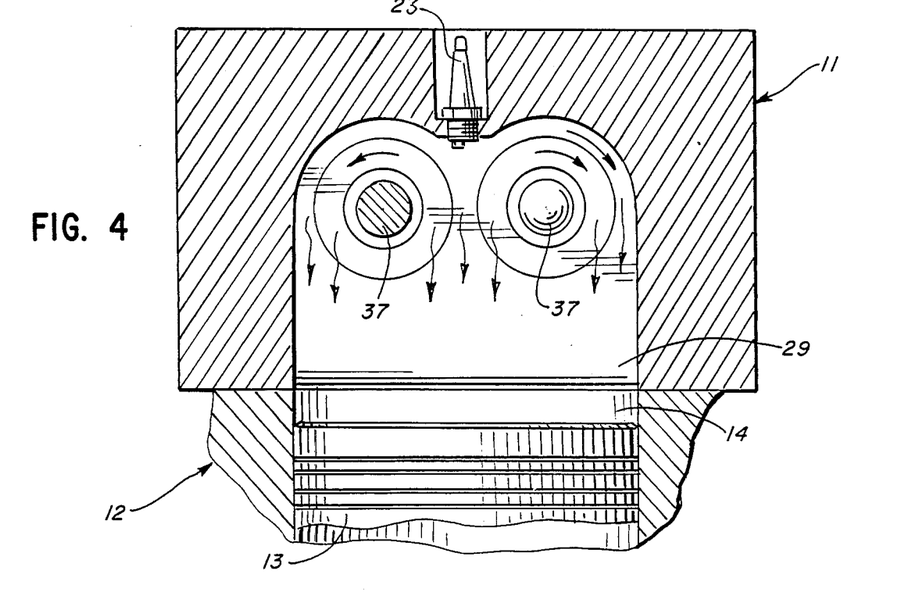
FIG. 4 is an enlarged, fragmentary view through a combustion chamber and the upper portion of its associated piston and cylinder, taken in the plane of the line 4—4 in FIG. 3.

In accordance with the present invention, each head increment 15 has a "thin" combustion chamber 29 which in the present instance extends perpendicular to the bottom face of the cylinder head 11 and also perpendicular to the axis of the crankshaft. Its width is equal to or slightly less than the diameter of the cylinder 14 and its thickness may fall within the range of 10-15% of the cylinder diameter. In one exemplary engine embodying the invention, the thickness of the combustion chamber may be on the order of ⅜ of an inch. A sparkplug 23 is situated at the top center or apex of the combustion chamber (FIGS. 3,4). Two header tubes 30, 31, one defining intake port 32 and the other exhaust port 33, are mounted side by side in the wall 43 of the combustion chamber farthest from the camshaft. These header tubes have suitable watertight seals 30a, 31a at each end to preclude leakage of fluid coolant from the surrounding coolant jacket 35 and are retained in place by means of a manifold mounting plate (not shown). Intake valve 26 and exhaust valve 28 of unique configuration are mounted on the opposite wall 43a of the combustion chamber in axial alignment with the intake and exhaust ports, respectively.

Figure 5:
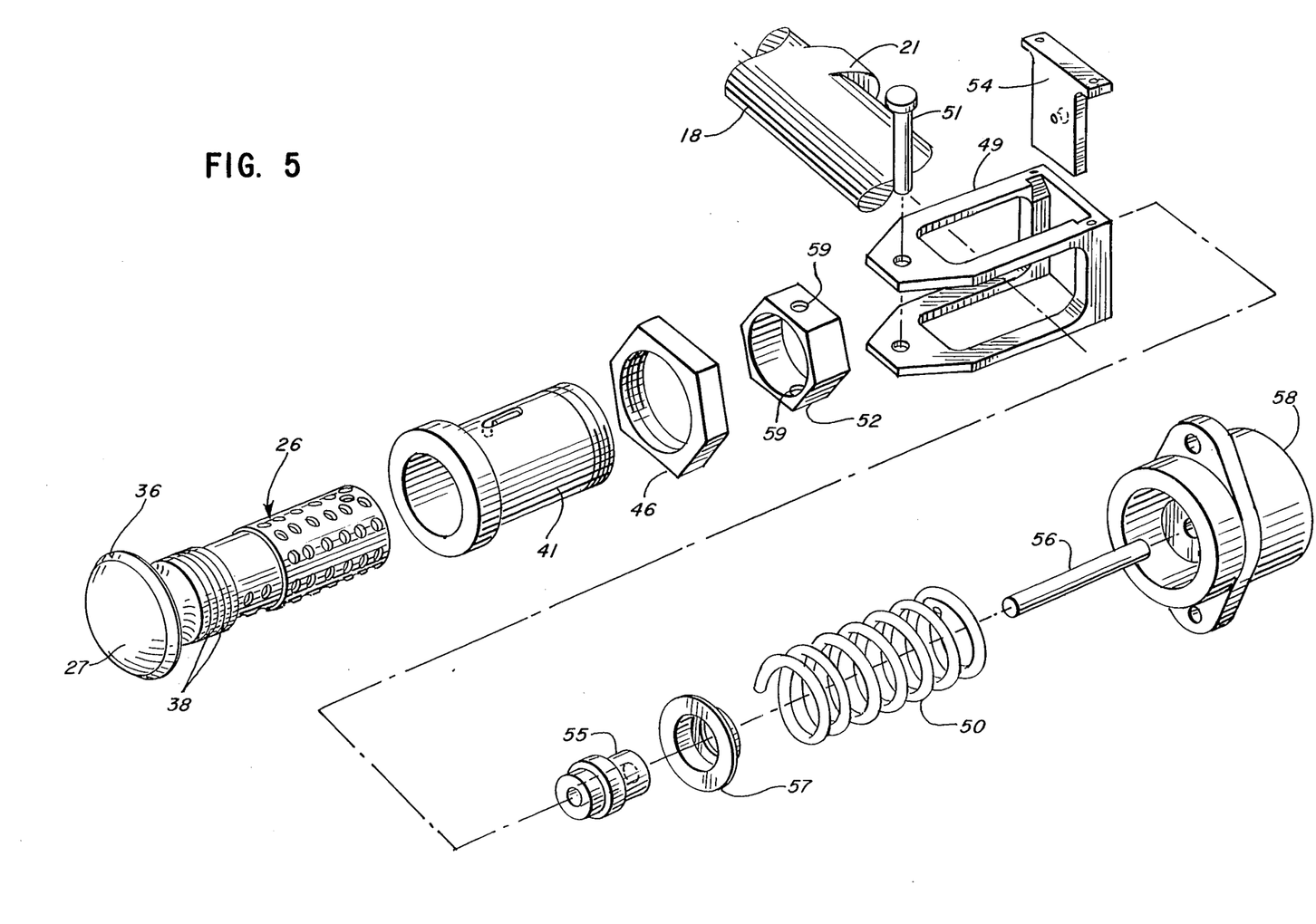
FIG. 5 is an exploded perspective view showing details of the components of one of the valve trains situated in the cylinder head.

The intake and exhaust valves 26, 28 are of the poppet type and may be identical in construction. They differ materially from conventional poppet valves, however. Each valve has a head 27 with a flattened oval contour on its outer face and a generally flat contour on its under face. It has a frustoconical sealing surface 36 located adjacent the peripheral edge on its outer face (relative to the valve stem) rather than on its opposite face as in a conventional internal combustion engine valve. The stem 34 of the valve includes a short neck 37 of double concave or spool shaped cross section adjacent the valve head, and a longer hollow tubular portion 40 of annular cross section adjoining the double concave neck portion 37. Two oil sealing rings 38 are situated on the valve stem 34 adjacent the spool shaped neck to preclude leakage of oil into the combustion chamber or leakage of gases out of the combustion chamber (FIGS. 2, 3, 5).

The annular portion 39 of the stem is perforated throughout a substantial part of its length and its intermediate tubular portion 40 is of slightly reduced outer diameter, all to facilitate abundant lubricating oil flow and cooling. Pressurized oil is supplied to the valve by inlet port 53 in the valve guide sleeve.

Referring more specifically to FIGS. 2 and 3, it will be noted that each poppet valve 26, 28 is slidably mounted in a respective valve guide sleeve 41, 42 for reciprocating travel transversely of the combustion chamber. Each guide sleeve has a respective shoulder 44, 45 and pressure seal 47 at its end adjoining the combustion chamber 29, and a respective retainer nut 46, 48 at its opposite end. As shown in FIG. 2, the intake valve 26 is in closed position with its frustoconical sealing surface 36 pressed against the frustoconical intake port 32 of the intake header tube. The double concave neck 37 of intake valve 26 is thus positioned across the combustion chamber. The exhaust valve 28 is disposed with its head still in the combustion chamber, its neck 37 withdrawn into the valve guide sleeve 42, but still in a full open position relative to the exhaust header tube 31 (FIGS. 2, 3).

Both valves 26, 28 are opened by cams 21, 22 on camshaft 18 journaled in the cylinder head and acting on a valve follower cage 49 against the pressure of the valve spring 50. The follower cage is connected at its forward end to the end of the tubular portion 39 of the valve stem by means of a vertical pin 51 and a hexagonal shoe 52. At its rearward end, the follower cage 49 has a hardened steel wear plate 54, engageable by the cam, and a rearwardly extending dowel engaging tube 55. The latter slidably engages a fixed dowel pin 56 secured in the valve spring retainer collar 58 fixed to the cylinder head 11. Optimum axial alignment of all reciprocating parts is thus maintained a each end of the valve train.

It will be apparent from the foregoing that each valve is positively opened in properly timed relation by means of its associated cam. Upon rotation of its cam 21, 22 out of contact with the wear plate 54, the valve will be permitted to close under the pressure of the valve spring 50. Each valve stem on the outside and inside surface, and each cam, cam follower cage, dowel tube and dowel pin is flooded with lubricating oil from a pressurized oil circulating system.

Referring further to FIG. 4, it will be noted that upon the compression and power strokes of the piston both valves will be closed. During compression and upon ignition by the sparkplug 23 of the explosive charge in the combustion chamber 29, each valve neck 37 will serve as a center of swirl. Three paths of swirl will thus occur, one between each valve neck and the adjacent outer peripheral wall of the combustion chamber, and the third extending downwardly between the two valve necks. These respective swirls, plus the residual microturbulence from the compression "squish" action, will blend into complex a pattern of extremely high vorticity, and this will result in improved fuel-air mixing, improved combustion process, and greatly reduced emissions of CO, hydrocarbons, and oxides of nitrogen.

Figures 6, 6A, 6B:
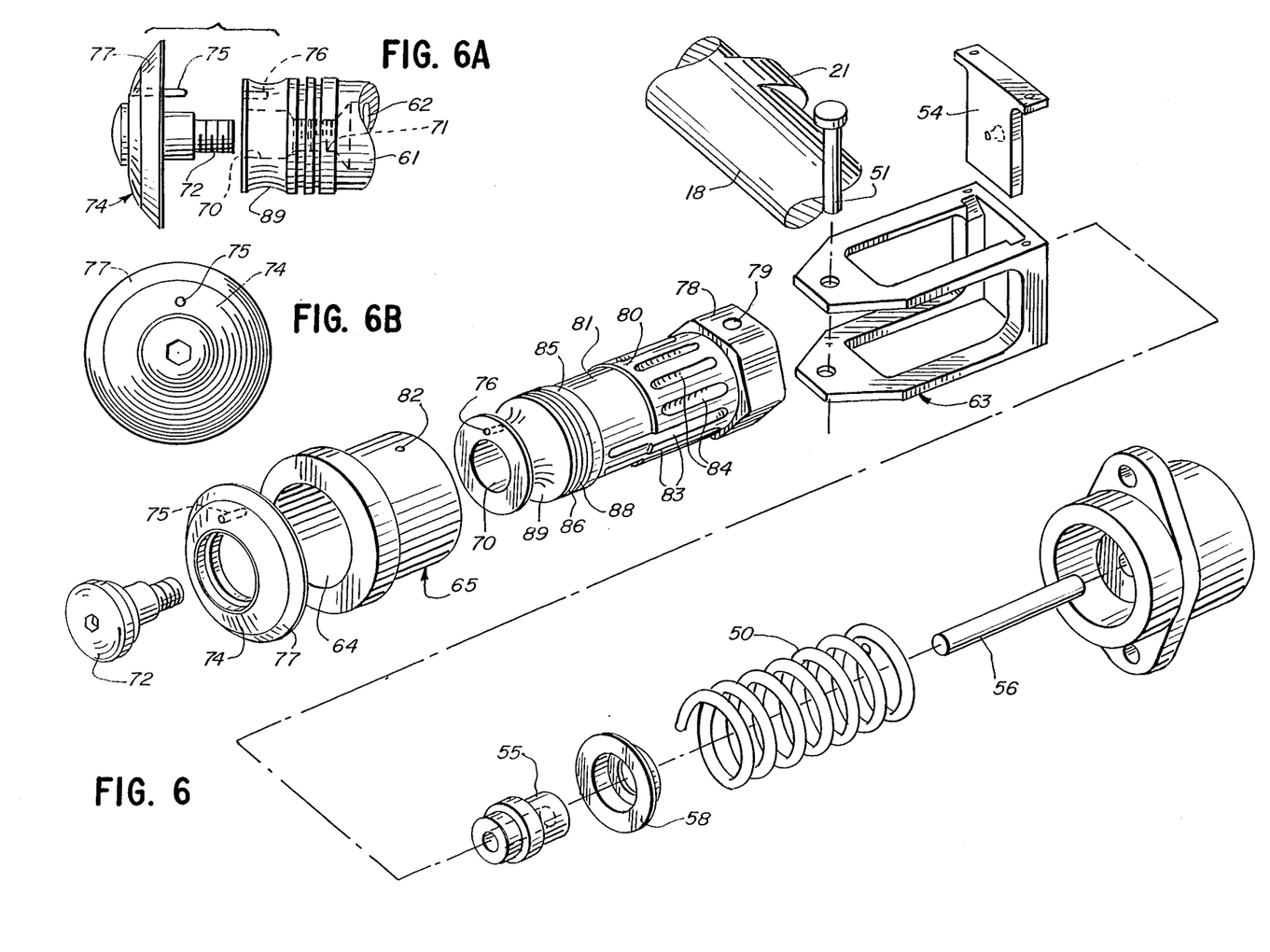
FIG. 6 is an exploded perspective view of a novel intake or exhaust valve having a detachable valve face and an integral pin carrier, including the other elements of the valve train.
FIG. 6A is an enlarged, fragmentary elevational view of the valve face and front end portion of the valve stem shown in FIGS. 6 and 7 illustrating the positioning pin and pin bore.
FIG. 6B is an enlarged elevational view of the front of the valve face showing the outer end of the positioning pin.
Figure 7:
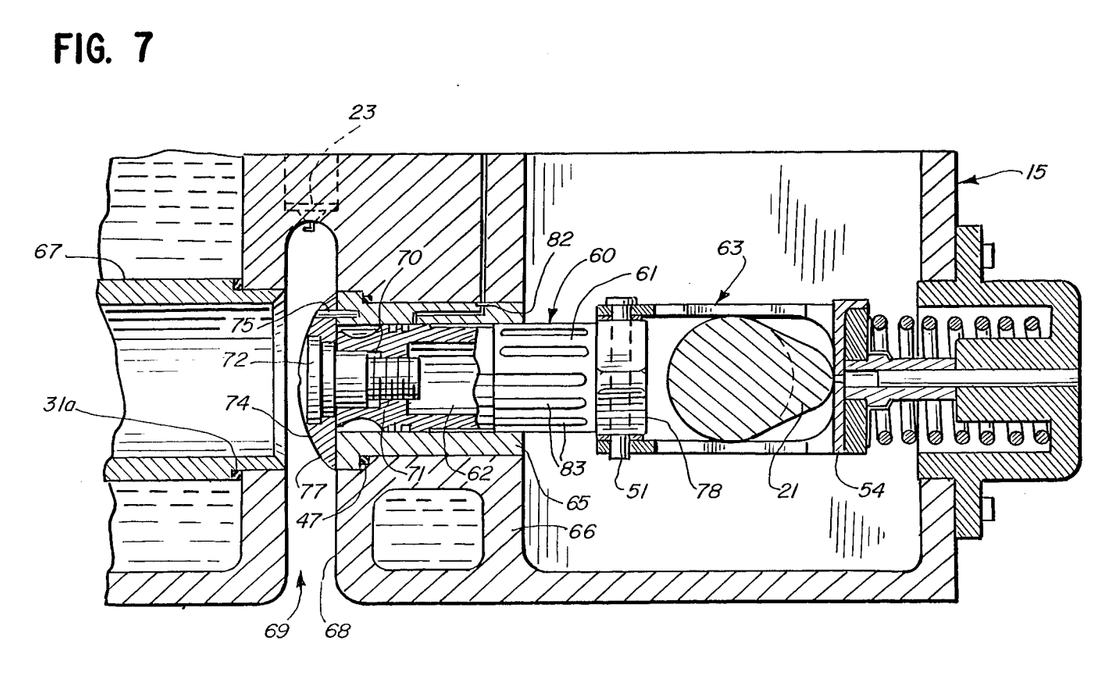
FIG. 7 is a vertical sectional view taken axially of the valve shown in FIG. 6 as assembled in the valve train with the valve face extending into the combustion chamber.

Referring next to FIGS. 6 and 7, there is shown a novel valve 60 of the poppet type which may be used in an internal combustion engine as an intake or an exhaust valve. The valve 60 comprises a hollow unitary stem 61 of generally cylindrical cross section with a stepped axial bore 62 running the full length of the stem. The stem 61 is mounted for reciprocation in bore 64 of annular valve guide sleeve 65. The guide sleeve 65 is rigidly mounted in a relatively thick partition wall 66 formed in the cylinder head and has its left end face flush with the right hand wall 68 of the combustion chamber 69 (as viewed in FIG. 7).

Adjacent its left hand end, the valve stem 61 has a locating bore 70 slightly in excess of ½ inch in diameter and beyond the bore a threaded section 71 somewhat smaller in diameter (FIGS. 6, 6A). The bore 70 and threaded section 71 receive valve head retainer bolt 72 which centers the valve face 74 and secures it to the forward end of the valve stem 61. The valve head 74 carries a small positioning pin 75 which fits into a corresponding pin bore 76 in the front face of the valve stem. This precludes any rotation of the valve head once the retainer bolt is tightened. The valve head 74 has a frustoconical sealing surface 77 on its periphery which sealingly engages the frustoconical sealing surface 32 or 33 of the opposed port, intake or exhaust, with which it coacts.

Externally, the valve stem 61 is formed with an integral pin carrier 78 of hexagonal shape situated at its right hand end as shown in FIGS. 6 and 7. The pin carrier has a pair of diametrically opposed holes 79 extending vertically through its upper and lower faces for engagement by the connecting pin 51 of valve follower cage 63. These latter two members and the valve train drives are substantially identical with those of the embodiment disclosed in FIGS. 1–5 above.

To the left of the pin carrier 78, the valve stem has a land section 80 with a diameter which slidably fits the bore 64 of the valve guide sleeve. To the left of the land section 80 is a recessed section 81 of slightly smaller diameter to facilitate the distribution of pressurized lubricating oil from the inlet port 82. Both the land section 80 and the recessed section 81 are formed with longitudinal, circumferentially spaced grooves 83, which extend along both sections 80, 81. The land section 80 also includes longitudinal, circumferentially spaced grooves 84 which do not extend beyond the section 80. All of these grooves provide augmented surface area to facilitate dissipation of heat from the valve.

To the left of the recessed section 80 is another land 85 with a diameter which slidably fits the bore of the valve guide sleeve. This land includes a pair of shallow grooves which in this instance are approximately 0.0485–0.0495 inches in width, and approximately 0.1036–0.0990 inches in depth. These grooves accommodate a pair of oil sealing rings, 86, 88 to preclude leakage of oil into the combustion chamber or escape of gases from the chamber.

The foremost portion of the valve stem 61 between the valve head 74 and the land 85 is a neck 89 of double concave cross section (FIGS. 6, 6A). The neck 89 extends across the combustion chamber 69 when the valve 60 is closed and thereby augments the swirl pattern, fuel-air mixing, and combustion, greatly reducing emissions.

Turning now to FIGS. 8–14, another novel valve 90 of the poppet type is there shown. This valve, like the others described earlier herein, may be used as an intake or an exhaust valve. The valve 90 has a hollow unitary stem 91 of generally cylindrical cross section with a stepped axial bore 92 extending from its rearward face to a point a short distance back from the shoulder 94 and hub 95 on which the valve head 96 is seated. The hub 95 has a small radially extending locating pin 98 and a threaded extension 99 of slightly smaller diameter. The valve head 96 has a bore 101 adapted to fit closely on the hub 95 and also includes a radial slot 102 which registers with the locating pin 98. The valve head is precisely positioned axially against the shoulder 94 and centered radially upon the hub 95. It is secured in that condition by means of nut 104 and lock washer 105.

Figure 8:
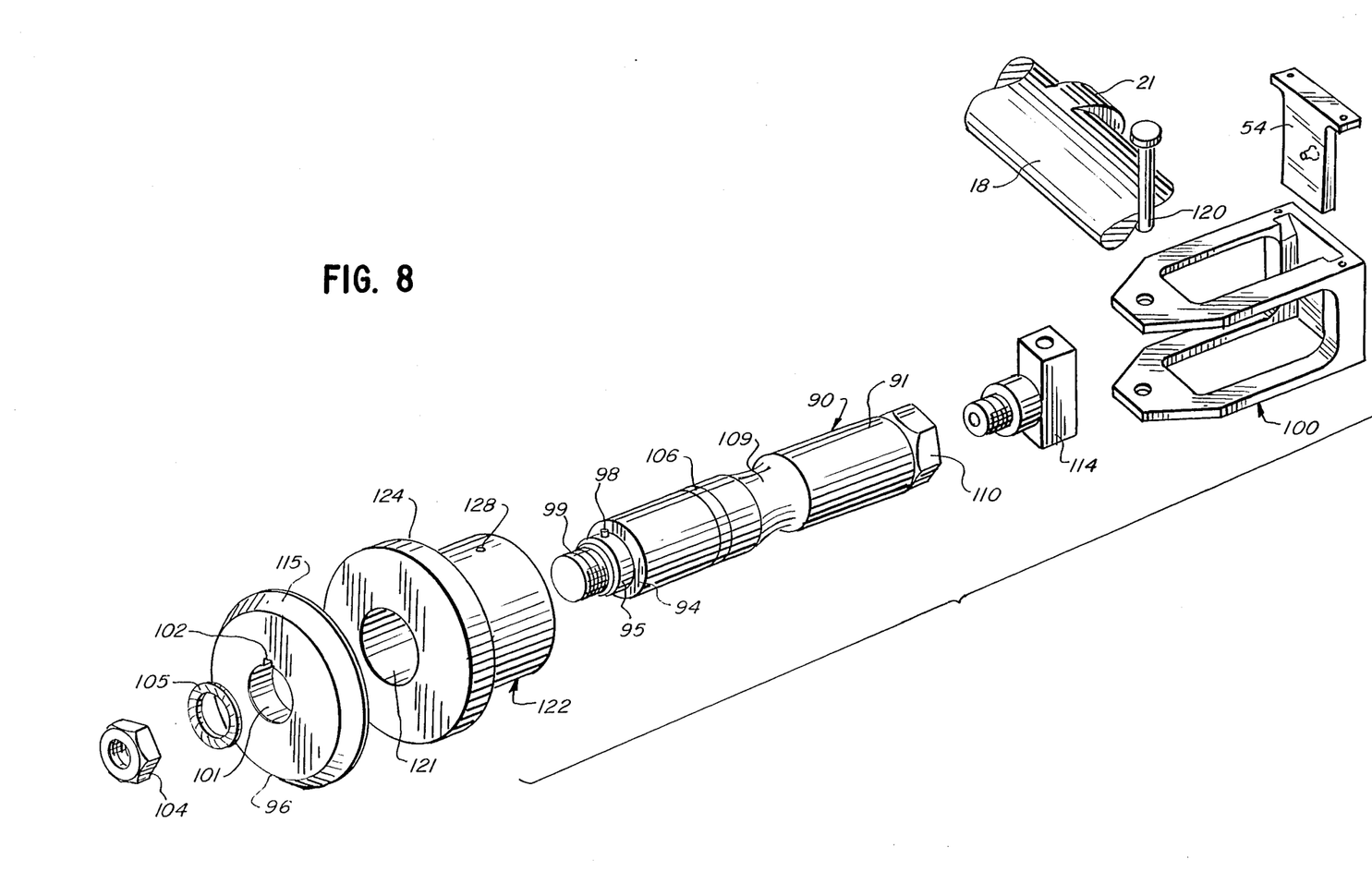
FIG. 8 is an exploded perspective view of another novel intake or exhaust valve having a detachable valve face and a detachable pin carrier, the latter adapted for adjustably positioning the valve in the valve train.
Figure 9:
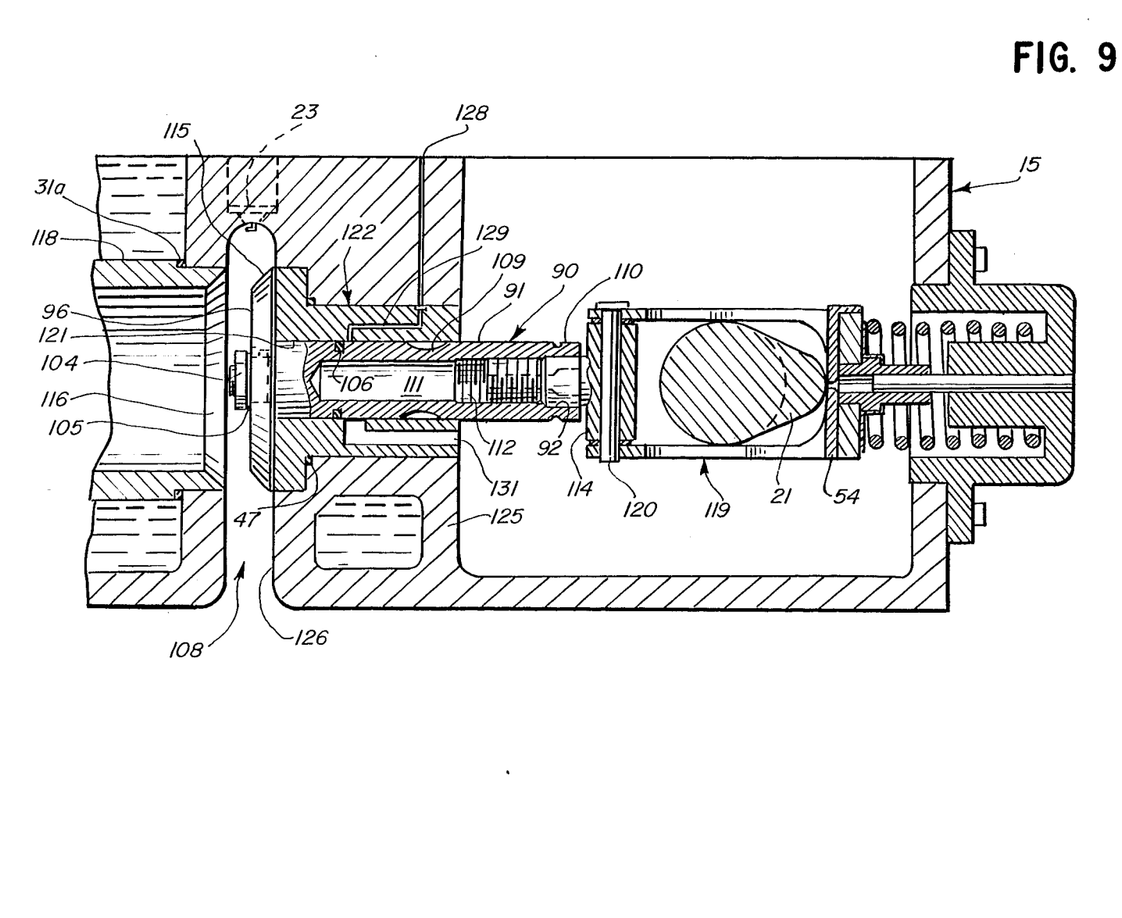
FIG. 9 is a vertical sectional view taken axially of the valve shown in FIG. 8 as assembled in the valve train with the valve face extending into the combustion chamber.
Figure 10:
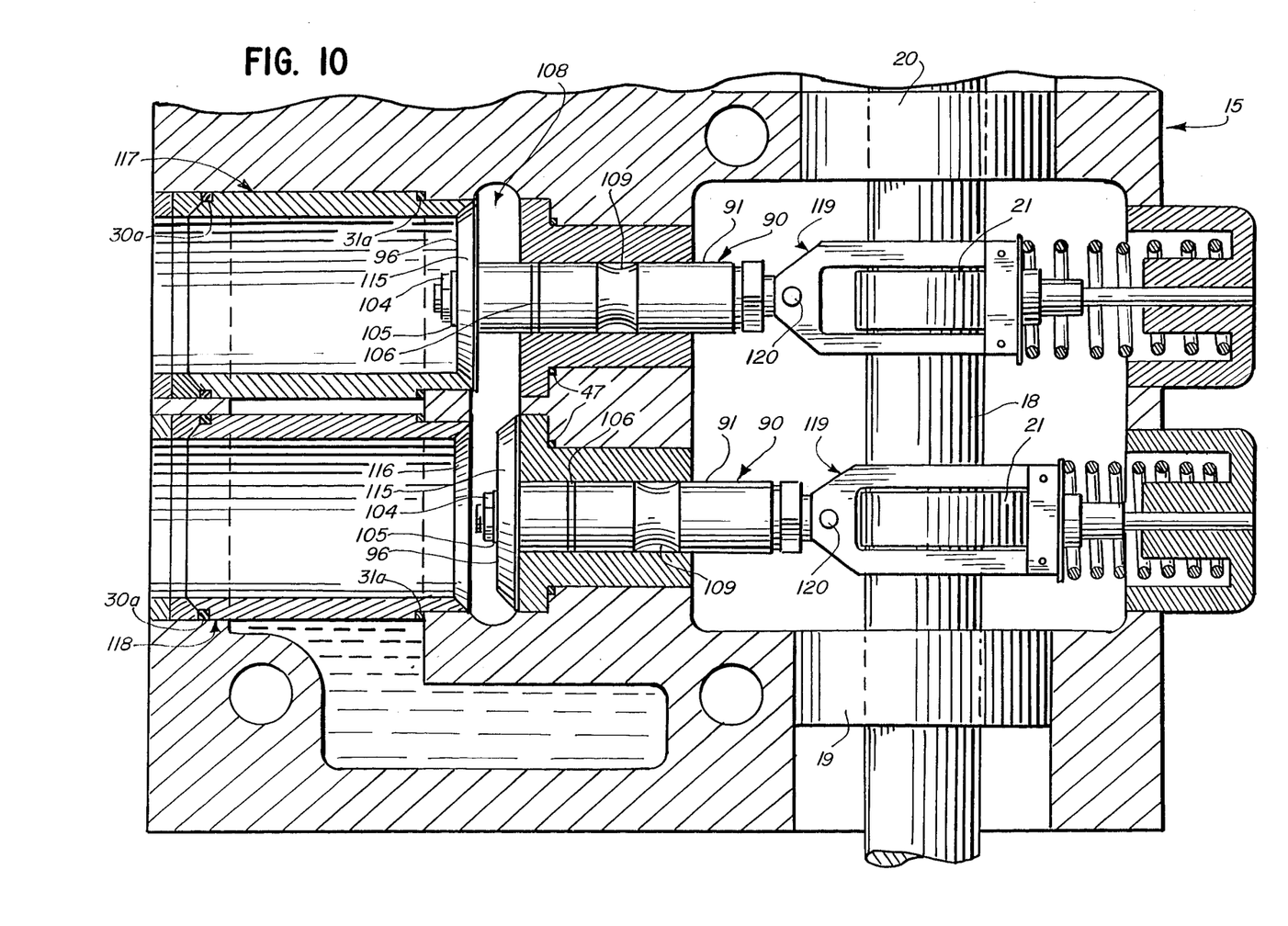
FIG. 10 is a plan view of the intake and exhaust valves corresponding to the novel valve shown in FIGS. 8 and 9 and each assembled in its respective valve train.

The exterior of the valve stem 91, starting to the rear of the valve head 96, has a sealing ring 106 designed to prevent leakage of lubricating oil into the combustion chamber 108 or leakage of gases out of the combustion chamber. Further toward the rear, the valve stem is formed with a peripheral recess 109 of double concave cross section and which relates to operation of the lubricating system. At the extreme rear, the valve stem includes an integral hexagonal portion 110 for engagement with a wrench when attaching or detaching the valve head 96.

The interior of the valve stem 91, starting at the rear, includes a plain cylindrical bore 92 and a threaded bore 112 extending forwardly from the bore 92. The bores 92, 112 are adapted to receive a mating extension of a generally T-shaped pin carrier and valve adjuster 114. The adjuster 114 is used to adjust the valve stem 91 and valve head 96 axially for proper engagement with the frustoconical sealing surfaces 115 of the valve head and 116 of the aligned header tube 118. The adjuster 114 is also used to connect the valve stem 91 to the associated cam driven valve follower cage 119 by means of pin 120.

The valve 90, including the valve stem 91, is adapted for reciprocation in bore 121 of annular valve guide sleeve 122. The valve guide sleeve has a generally cylindrical body with an enlarged shoulder portion 124 at one end. The guide sleeve 122 is rigidly mounted in an appropriate recess in partition wall 125 of the cylinder head with its enlarged shoulder portion flush with the right hand wall 126 of the combustion chamber 108 (as viewed in FIG. 9).

Figure 14:
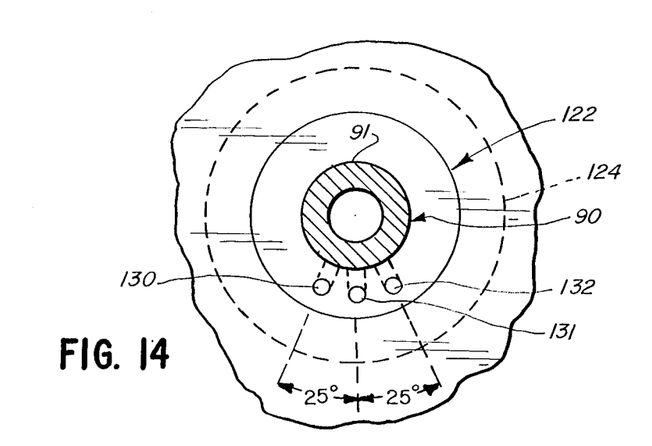
FIG. 14 is an enlarged end view of the valve guide showing the three oil ducts for withdrawing oil from the valve guide.

Pressurized lubricating oil is supplied to the valve guide sleeve 122 via a supply line 128 from a pump (not shown) on the engine. The supply line 128 connects directly with an internal line 129 in the valve sleeve which lubricates the valve stem 91. In order to avoid build-up of an excessive amount of oil between the valve guide sleeve bore 121 and the valve stem 91 with possible leakage into the combustion chamber, the valve sleeve bore 121 is provided with three individual drain lines 130, 131, and 132 distributed over a 50 degree arc in the lower sector of the valve sleeve (FIG. 14). In combination with such arrangement, the medial portion of the valve stem 91 is formed with a necked down portion 109 of double concave cross section.

Figure 11:
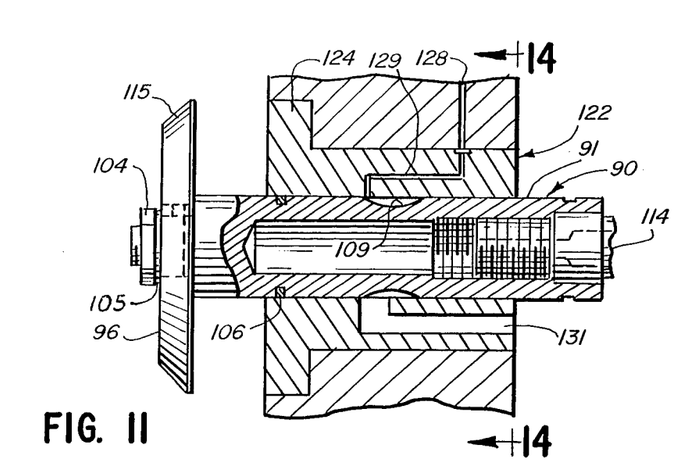
FIGS. 11-13 are enlarged fragmentary views of an intake or exhaust valve as shown in FIG. 8 illustrating the pumping action of the valve stem to expedite drainage of oil from the valve guide.
Figure 12:
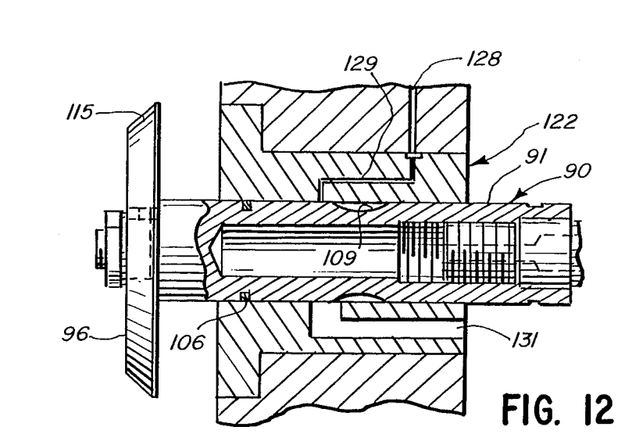
Figure 13:
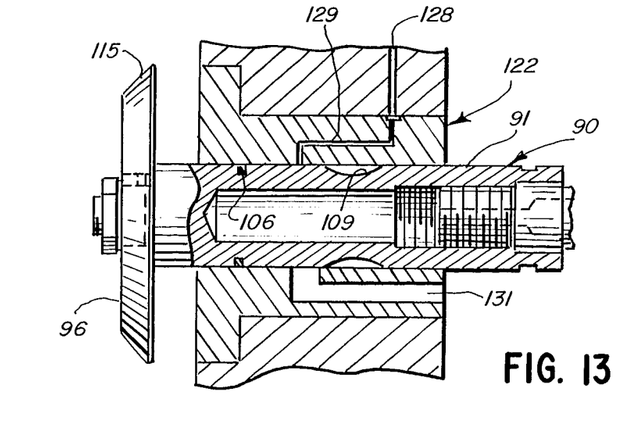

Referring to the three sequential views in FIGS. 11, 12 and 13, as the valve stem 91 reciprocates, it captures a substantial increment of oil in the necked down portion 109 and "pumps" it into the three drain lines 130, 131, and 132 in the lower segment of the guide sleeve This action enhances the circulation of lubricating oil around the valve stem and oil between the valve stem and the bore of the valve sleeve.

Installation or removal of any of the valves 26, 28, 60 or 90 may be accomplished quickly and easily without removing the cylinder head from the engine block. In the case of the valves 26 and 28, removal may be effected by draining the cooling fluid from the coolant jacket of the cylinder head; removing the connecting pins 51 from the valve follower cages 49 and right hand end of each valve; removing the header tubes 30 and 31; and sliding the valves 26, 28 out of their valve guide sleeves and through the header tube apertures (FIGS. 2, 3). Installation of the valves 26, 28, or new valves, may be accomplished by reversal of the foregoing procedure.

Installation or removal of the valves 60 may be accomplished in a manner similar to the foregoing except that the valve guide sleeves 65 must be pushed to the left; the header tubes 67 removed; and the valves 60 and their guide sleeves 65 are slid out through the header tube apertures. Installation of the valves 60 may be effected by reversal of the foregoing steps.

Installation or removal of the valves 90 may be done in a manner similar to the procedure for the valves 26, 28. In this instance, after the connecting pin 120 is removed from the cam follower cage and the pin carrier and valve adjusters 114 are unscrewed from their respective valve stems the removal procedure is similar to that for the valves 26, 28. Installation of the valves 90 is accomplished by reversal of the foregoing steps.

In a situation where the cylinder head is removed from the engine block and placed on a workbench, a different installation or removal procedure may be followed for the valves 60 and 90 which have detachable heads. In both of these cases, the camshaft is removed along with the valve follower cages 63, 100; the valve heads 74 and 96 are unbolted from their respective valve stems; and the valve stems are slid to the right and withdrawn from their valve guide sleeves. Installation may be accomplished by reversal of this procedure.

What is claimed is:

1. In a valve-in-head reciprocating internal combustion engine having a block including at least one cylinder with a piston reciprocable therein, the combination comprising:
    (a) a cylinder head secured to said block and serving as a closure for the compression end of the cylinder;
    (b) means defining a relatively thin combustion chamber communicating directly with the compression end of said cylinder;
    (c) a poppet valve mounted for reciprocation in a bearing sleeve transversely of said combustion chamber, said bearing sleeve being recessed in one face of said combustion chamber;
    (d) said poppet valve having a head with a generally flat contour on its under face, and a neck adjacent the latter;
    (e) means defining a port in a face of said combustion chamber opposite said one face with said bearing sleeve; and
    (f) means for engaging said poppet valve head with said port during the compression and power strokes of said piston with said poppet valve neck extending across said combustion chamber.

2. The combination set forth in claim 1 wherein said head of said poppet valve has a peripheral sealing area adapted to engage said port.

3. The combination recited in claim 1, wherein said poppet valve has a stem slidably mounted in said bearing sleeve and has a diameter greater than that of said neck.

4. The combination defined in claim 3, wherein said stem is of annular cross section and said neck is generally spool shaped.

5. The combination recited in claim 4, wherein said annular cross section stem is perforated to facilitate lubricant flow.

6. The combination set forth in claim 1, wherein said poppet valve is cam actuated.

7. The combination called for in claim 1, which includes means for igniting the charge in the combustion chamber upon substantial completion of the compression stroke of said piston.

8. The combination recited in claim 1, in which said port in said opposite face of the combustion chamber is defined by a fluid cooler header tube.

9. The combination set forth in claim 3, wherein said poppet valve stem includes lubricant seal means adjacent said neck.

10. The combination recited in claim 9, wherein said poppet valve stem has a reduced diameter section adjacent said lubricant seal means to facilitate the flow of cooling lubricant.

11. The combination recited in claim 1 which further comprises:
    (a) a second poppet valve identical to said first recited poppet valve and disposed side by side therewith for reciprocation in a second bearing sleeve;
    (b) means defining a second port in the face of said combustion chamber opposite said second bearing sleeve; and
    (c) means for engaging said second poppet valve with said second port during the compression and power strokes of said piston with both poppet valve necks extending across said combustion chamber.

12. The combination defined in claim 11, wherein each said poppet valve has a stem of annular cross section adjacent said neck and said stem is slidably mounted in the associated bearing sleeve.

13. The combination defined in claim 12, wherein each said poppet valve stem is perforated to facilitate lubricant flow and each said neck is generally spool shaped.

14. The combination set forth in claim 13 which includes means for igniting the charge in the combustion chamber upon substantial completion of the compression stroke of the piston with the necks of both valves extending across the combustion chamber.

15. The combination recited in claim 14 wherein one said poppet valve is an intake valve and the other is an exhaust valve.

16. The combination recited in claim 11, wherein said poppet valves may be interchangeable.

17. The method of combusting hydrocarbon fuels in an internal combustion engine comprising the steps of:
(a) providing a combustion chamber in the cylinder head of the engine;
(b) placing a valve stem transversely of said combustion chamber in sealed relation with an aperture on the opposite side of the chamber;
(c) thoroughly mixing fuel and air in a highly turbulent environment adjacent a spark source in said combustion chamber, said environment induced by the configuration of said valve stem, causing the gaseous fuel-air mix to swirl at high velocity prior to spark ignition.

18. The method set forth in claim 17, wherein a pair of valve stems are laterally spaced and disposed transversely of said combustion chamber in sealed relation with respective apertures on the opposite side of said chamber.

19. The combination set forth in claim 1, wherein said poppet valve has a head with an annular sealing area on its outer face engageable with an annular sealing area on said port.

20. The combination set forth in claim 11, wherein said poppet valves have heads with annular sealing areas on their outer faces engageable with respective annular sealing areas on said ports.

21. The combination set forth in claim 3, wherein the diameter of said valve set is substantially equal to that of said neck.

22. The combination set forth in claim 1 wherein said poppet valve has a detachable head.

23. The combination recited in claim 11, wherein said poppet valves both have detachable heads.

24. In a valve-in-head reciprocating internal combustion engine as set forth in claim 1, a valve having a stem of annular cross section and a detachable head.

25. A valve as recited in claim 24 having a pin carrier integral with said valve stem and driven by a cam actuated valve follower cage.

26. A valve as recited in claim 24 having a neck of double concave cross-section adjacent said head, a second of slightly reduced diameter to facilitate oil flow, and a plurality of longitudinally extending circumferentially spaced grooves for heat dissipation.

27. A valve as recited in claim 24 having an annular valve stem slidably mounted in an annular valve guide sleeve, a pin carrier and valve adjuster threadedly connected to said valve stem and driven by a cam actuated follower cage.

28. A valve as recited in claim 27 having a stem with a sealing ring between the lubricating oil ports and the valve head, said stem having a necked down portion communicating intermittently with said oil ports in a pumping action producing positive drainage of oil from said valve stem and guide sleeve.

29. The method of combusting hydrocarbon fuels in an internal combustion engine comprising the steps of:
(a) providing a combustion chamber in the cylinder head of the engine;
(b) placing a valve stem transversely of said combustion chamber in sealed relation with an aperture on the opposite side of the chamber;
(c) thoroughly mixing fuel and air in said combustion chamber by the swirling bulk gas motion and the microturbulence which have both been induced by the configuration of the combustion chamber, the valve locations, and the valve stems during the compression and power strokes.

* * * * *